United States Patent [19]

Yonekawa et al.

[11] Patent Number: 5,046,121
[45] Date of Patent: Sep. 3, 1991

[54] IMAGE DATA COMPRESSION APPARATUS

[75] Inventors: Hisashi Yonekawa; Yoshiyuki Ishimitsu; Junichirou Akune, all of Tokyo, Japan

[73] Assignee: Konica Corporation, Tokyo, Japan

[21] Appl. No.: 472,669

[22] Filed: Jan. 30, 1990

[30] Foreign Application Priority Data

Jan. 31, 1989 [JP] Japan .................................. 1-21903
Jan. 31, 1989 [JP] Japan .................................. 1-21904

[51] Int. Cl.$^5$ .............................................. G06K 9/00
[52] U.S. Cl. ...................................... 382/56; 382/27; 382/43; 356/426
[58] Field of Search ................. 382/43, 56, 27, 41; 358/426

[56] References Cited

U.S. PATENT DOCUMENTS

4,751,742 1/1988 Meeker ................................ 382/41
4,802,232 1/1989 Altes .................................... 382/56

Primary Examiner—David K. Moore
Assistant Examiner—Dan Santos

[57] ABSTRACT

An image data compression apparatus, in that a component characteristic value of an AC component in a block obtained by dividing digital tonal image data is compared with a predetermined threshold value so that a frequency of an AC component at the highest frequency side having the component characteristic value over the threshold value is determined as a boundary value, and in that the AC component exceeding the boundary value is not handled as a substantial transform coefficient. When the transform coefficients in a high-frequency side in the block is cut according to an image content of the block a lower limit of a frequency to be cut is determined, so that a frequency lower than the lower limit determined may not be cut.

2 Claims, 12 Drawing Sheets

| $\frac{1}{Z}$ BLOCK NO. | A | B |
|---|---|---|
| $\frac{0.25}{2048}$ | 0.4288 | 0.4490 |
| $\frac{0.50}{2048}$ | 0.7049 | 0.6702 |
| $\frac{0.75}{2048}$ | 0.7980 | 0.7890 |
| $\frac{1.0}{2048}$ | 0.8180 | 0.8300 |
| $\frac{2.0}{2048}$ | 0.8780 | 0.9130 |
| $\frac{5.0}{2048}$ | 0.9870 | 0.9420 |
| $\frac{10.0}{2048}$ | 1.3930 | 1.5040 |
| $\frac{15.0}{2048}$ | 1.3930 | 2.0390 |
| $\frac{20.0}{2048}$ | 1.3930 | 2.5720 |
| $\frac{2048}{2048}$ | 1.3930 | 7.8650 |

DIAGRAM OF RELATIONS BETWEEN INPUT/OUTPUT DATA OF ROM47

IMAGE DATA COMPRESSION APPARATUS

BACKGROUND OF THE INVENTION

1. Field of the Invention

The present invention relates to a tonal image data compression apparatus suitably applied for compressing a medical image such as an X-ray image and, more particularly, to an image data compression apparatus capable of achieving a high compression ratio without any deterioration of the image quality and achieving a reconstructed image of a high quality without any sacrifice of the compressibility of the image data.

2. Description of the Prior Art

A medical image such as the X-ray image is required to have a high digital conversion accuracy because it is used for the diagnoses and treatments by the doctor.

Thus, if the image data of the medical image are digitized, the amount of information digitally converted is massive in case. If, for example, a plain X-ray image (having tonal image data) of a chest taken on a large size film is digitized by means of a laser scanner, the amount (i.e., the storage capacity) of information is as much as 4 to 5M bytes for each image.

Considering the cost and transmission time for saving image data and transmitting them through communication lines, it is expedient to compress the image data before storage.

The technology for compressing the image data divided into reversible and irreversible compression technologies.

The former is a compression technique having a compression ratio of about 2:1 to 3:1, in which a reproduced image obtained by compressing/decompressing an original image is completely identical to the original image.

In the latter irreversible compression technique, on the contrary, the compression ratio obtainable is more than 5:1 although the reproduced image contains more errors. Therefore, recent investigations have been directed to improving the image quality of the irreversible compression technique.

The irreversible compression technique is exemplified by techniques using the orthogonal transforms. Of these, the cosine transform coding technique compresses the image data by using the transform called the cosine transform.

This cosine transform is one of the orthogonal transforms which are represented by the Fourier transform or the Hadamard transform. It is known that the best compression ratio can be attained if the orthogonal transformation is used.

In cosine transform coding, the properties of the image data are transformed into a compressible form by the cosine transform. Image data having various density distributions can be transformed into the fixed image properties having a small image dependency.

The fixed image data properties can be given by a Gaussian distribution having its peak at zero.

Figure 21A:
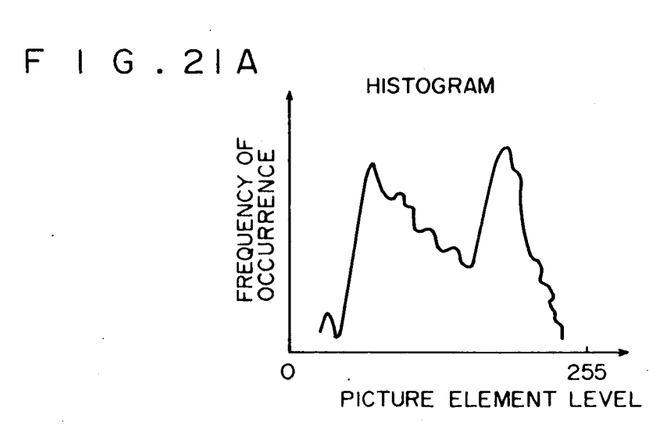
FIGS. 21A and 21B and FIGS. 22A and 22B are histograms showing the relations between distributions of picture element levels and those of transform coefficients.
Figure 22A:
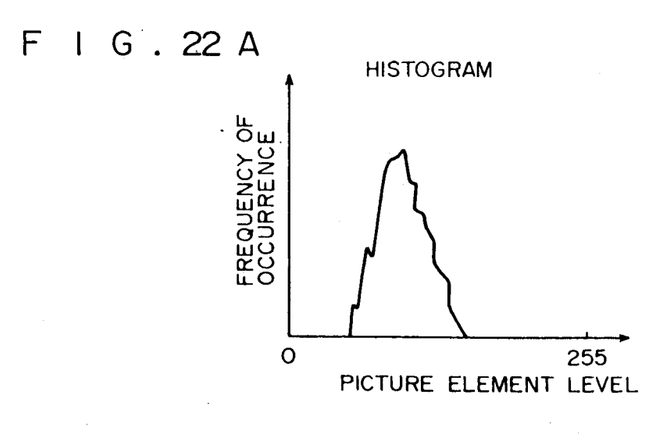

For example, one image is divided into a plurality of blocks, and the frequency of occurrence of the image data, which are obtained by digitizing the block image of one block, against each picture element level (or density level) is different, as shown in FIGS. 21A or 22A, in dependence upon the image characteristics of the block image.

Figure 21B:
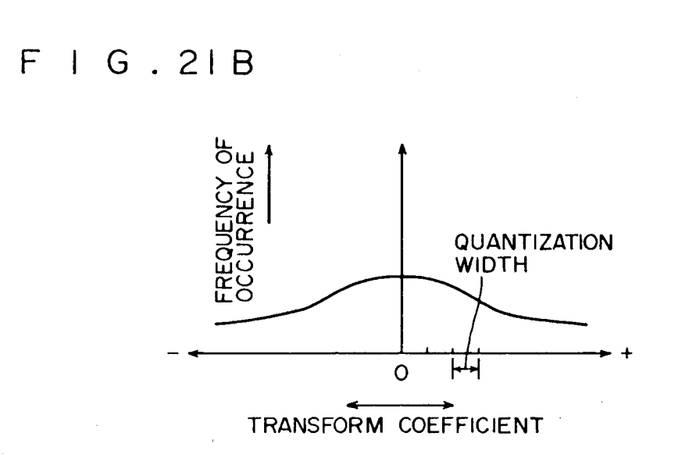
Figure 22B:
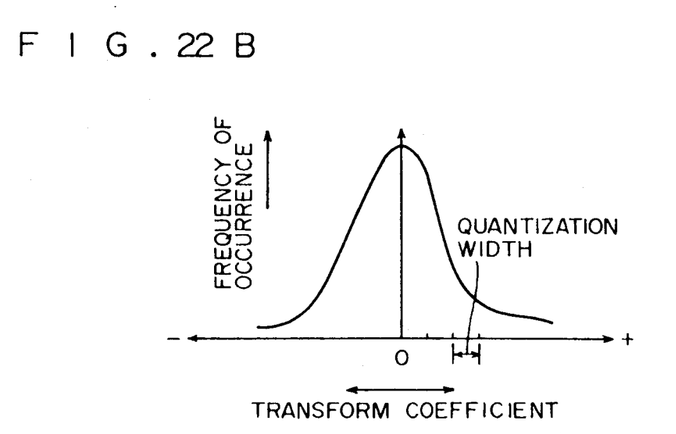

If, however, those frequencies of occurrence are subjected to the cosine transform, the block image of FIGS. 21A or 22A is caused to take the coefficient distribution (the Gaussian distribution), as shown in FIGS. 21B or 22B, i.e., a form having no dependency upon the image characteristics.

Here, the abscissa of the Gaussian distribution designates the transform coefficient of the AC component obtained by the cosine transform, and the ordinate designates the frequency of occurrence.

Since the transform coefficient has a real number value, the dynamic range of the coefficient is reduced if the transform coefficient is quantized. The image data can be compressed by coding the transform coefficient thus quantized.

Figure 23:
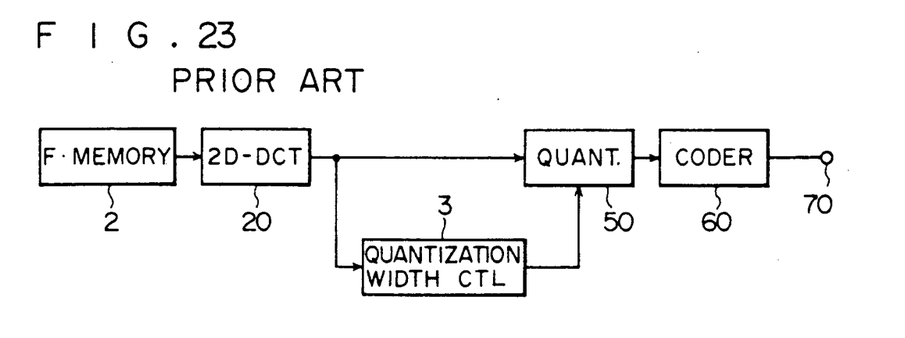
FIG. 23 is a block diagram showing one example of the image data compression apparatus according to the prior art.

FIG. 23 is a block diagram showing an essential portion of a conventional example of an image data compression device using the cosine transform coding described above.

The image data (having 10 bits per pixel in the present example), such as the aforementioned medical image to be compressed, are stored in a frame memory 2. In this example, the block size N is sixteen picture elements in both the line and column directions.

The block image data (or density data) are fed to a two-dimensional discrete cosine transformer (2D-DCT) 20 functioning as the orthogonal transform. The image data $f(i, j)$ (i and $j = 0, 1, \text{---}$, and 15) are subjected to the cosine transform to give 256 transform coefficients for one block. These transform coefficients are one direct current component (i.e., DC component) and 255 alternating current components (i.e., AC components).

Next, the 255 transform coefficients (i.e., the AC components) thus obtained from the 256 transform coefficients are fed to a quantizer 50 so that they are quantized with a predetermined quantization width outputted from a quantization width controller 3, until they are coded by a coding device 60. By the combination of quantization and coding, the image data compressed. Huffman Codes, Run Length Codes and Arithmetic Codes, etc. can be used for coding purposes.

The coded data are sent from a terminal 70 or stored in a memory (not shown).

In this transform coding, a high compression ratio is obtained by rounding the transform coefficients.

Figure 6:
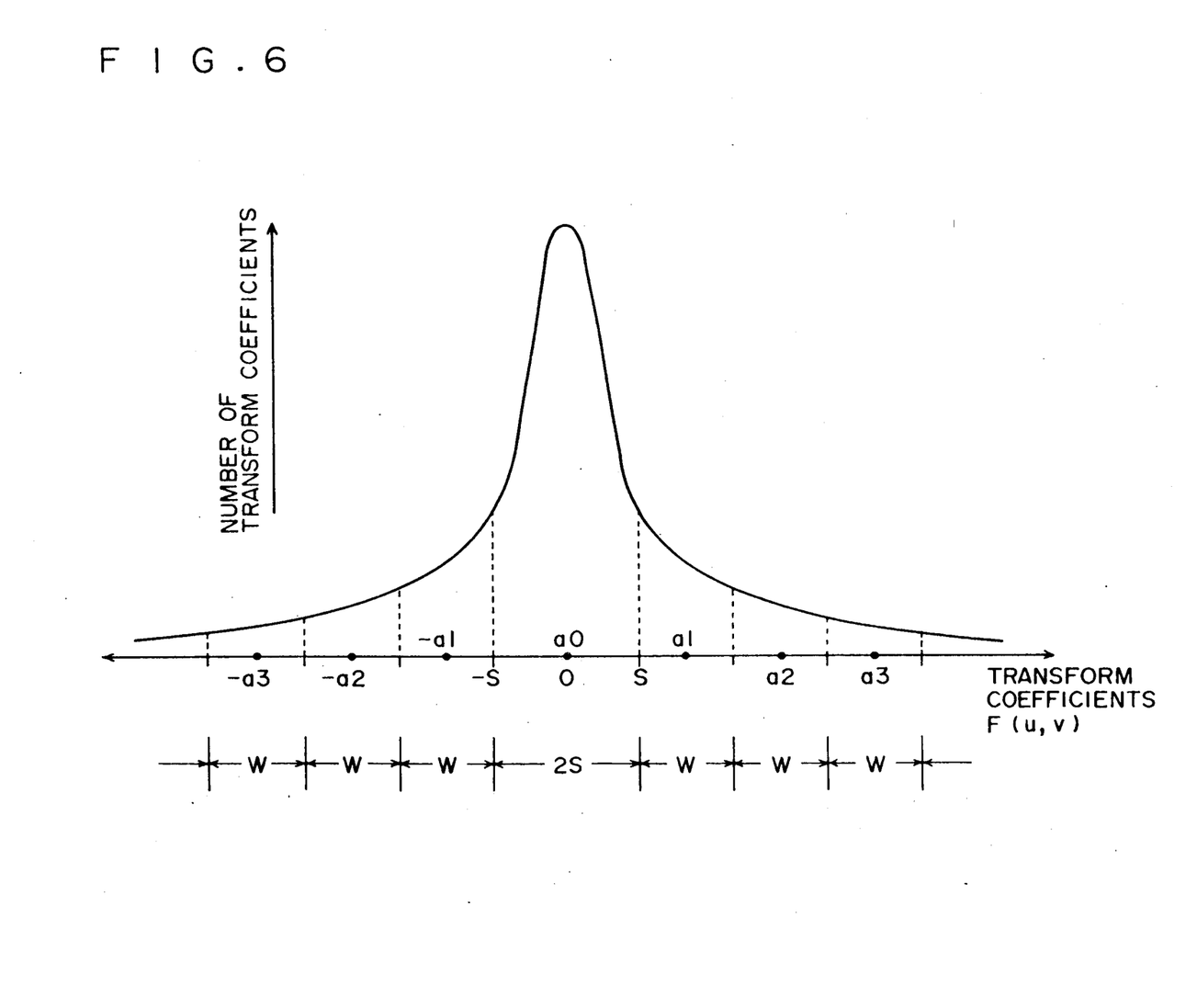
FIG. 6 is a chart showing the behavior of quantizations.

FIG. 6 is a chart showing the behavior of quantization. W and 2S indicate "quantization width". And $\pm a_n$ ($n = \phi, 1, 2, \ldots$) means quantized transform coefficients.

In this case, AC components with value greater than $-S$ and less than $+S$ are rounded off to zero ($= a_0$). At this time, one half of the quantization width 2S is called cutback threshold value S. The quantization for reducing the coefficients to zero by using the cutback threshold value S is well known as the "threshold coding", which can in the wide sense be thought as one of the quantizations.

Thus, the transform coefficients obtained by orthogonally transforming the image data, as described above, exhibit a tendency to concentrate most of the information for constructing the image at the coefficients of a lower frequency.

In this transform coding, therefore, the transform coefficients of higher frequency are usually cut off in the so-called "high-frequency cuttoff" before the coding is accomplished to compress the image data with a high compression ratio.

This method of cutting off the transform coefficients existing in the high-frequency side is well known as the "zonal coding".

However, the transform coding using the aforementioned zonal coding is accompanied by the following disadvantages. Since the block containing an image having intense density changes at the edges has some AC components of large amplitude at the higher-frequency range, the edges of the reconstructed image are blurred which deteriorates the image quality and the SN ratio seriously if the transform coefficients at the higher-frequency range are drastically cut off.

These image quality deteriorations cause the block boundary artifacts (in which the block boundary becomes prominent) to raise a fatal defect especially in a medical image for diagnosis.

SUMMARY OF THE INVENTION

An object of the present invention is to accomplish the compression of image data without any blur of the edge portion of a reconstructed image even if the high-frequency cutoff is accomplished to get a higher compression ratio.

In order to achieve the above-specified object, according to the present invention, there is provided an image data compression apparatus, wherein digital tonal image data is divided into a plurality of blocks, an orthogonal transform is performed in units of blocks to obtain transform coefficients, and the transform coefficients are quantized and coded, characterized:

in that characteristic values (refer to as component characteristic value r hereinafter) of the AC components of the block are compared with a predetermined threshold value R so that the frequency of the AC component of the highest frequency having said component characteristic values r over the threshold value R is determined as a boundary value; and in that the AC components exceeding said boundary value are not handled as the substantial transform coefficient.

first, the component characteristic values r of the AC components in the block are calculated. This component characteristic value r may be either that of the individual AC components in the block or that of several AC components in a group consisting of several components close to one another as classified from all the AC components in the block.

Specifically, a plurality of component characteristic values r exist in one block. On the other hand, the characteristic feature representing all AC components in the block is designated as a block characteristic value X to distinguish from the component characteristic value r. Accordingly, only one block characteristic value X exists in one block.

The component characteristic value r to be used may be the absolute value of each AC component, the sum of the absolute values of the AC components in a group or the square sum of the AC components in a group, whereas the block characteristic value X to be used may be the sum of the absolute values or the square sum of all the AC components in the block, or the number of AC components of which amplitude is smaller than a threshold value K as will be explained hereinafter. After the component characteristic value r is calculated, it is compared with a predetermined threshold value R. If there exists a component characteristic value r exceeding the threshold value R, the frequency Fmax of the AC component at the highest frequency is determined as a cutoff frequency C.

The transform coefficients up to the cutoff frequency are quantized and coded, and the AC components higher than the frequency C are not handled as the substantial transform coefficients. Therefore, the AC components exceeding the cutoff frequency C are not coded or are coded as zero.

Then, the reconstructed image can be prevented from image quality deterioration because the AC components in each block are not carelessly cut. The components having the larger amplitudes are important for constructing the reproduced image independently of the frequency.

Further, in case the high frequency cut off is carried out adaptively, a phenomenon in which the cutoff frequency of the block shifts to very low frequency occurs frequently depending on the block.

For example, with respect to the flat image in which the density change is very small, the amplitude of the AC component becomes nearly zero, so that entire AC component may sometimes be cut.

However, the amplitude, even though it is nearly zero, is very important in reconstructing the image quality and the delicate density change of the image in most cases. The lower the frequency component, the more the important it is to satisfactory image reconstruction.

Accordingly, an extreme high frequency cut should be avoided for an image, such as an image for medical use to which the delicate density change is important, even if the block is flat.

Accordingly, the present invention further contemplates solving the problems thus far described and has as an object to provide an image data compression apparatus which can obtain a high compression ratio and have an excellent reconstructed image by determining the lower limit of the cutoff frequency in case a cutoff frequency of each block is determined adaptively depending on the characteristics of the block.

In order to achieve the above-specified object, according to the present invention, there is provided an image data compression apparatus, wherein digital tonal image data is divided into a plurality of blocks, an orthogonal transform is performed in units of blocks to obtain transform coefficients, and the transform coefficients are quantized and coded, characterized in that when the transform coefficients in a high-frequency side in the block are cut according to an image content of the block, a lower limit of a cutoff frequency is determined so that a frequency lower than the so determined lower limit may not be cut.

The lower limit of the cutoff frequency may be determined either in accordance with a compression ratio designated from the outside or adaptively from the block characteristic value X indicating the nature of the block.

If the maximum frequency of the high-frequency component of the block, calculated from the component characteristic value r of the AC component of the block and a predetermined threshold value R, is lower than the lower limit of the cutoff frequency, the actual cutoff frequency is not dropped beyond the lower limit. In other words, the lower limit is set as the actual cutoff frequency in this case.

When the maximum frequency is greater than the lower limit, the maximum frequency is set at the actual cutoff frequency.

Thus, the AC components of a very lower frequency are always quantized and coded, so that the reconstructed image quality for each block can be warranted.

Other objects and features of the present invention will become apparent from the following description to be made with reference to the accompanying drawings.

DESCRIPTION OF THE PREFERRED EMBODIMENTS

One embodiment of an image data compression apparatus according to the present invention will be described in detail in the following with reference to FIG. 1.

Figure 1:
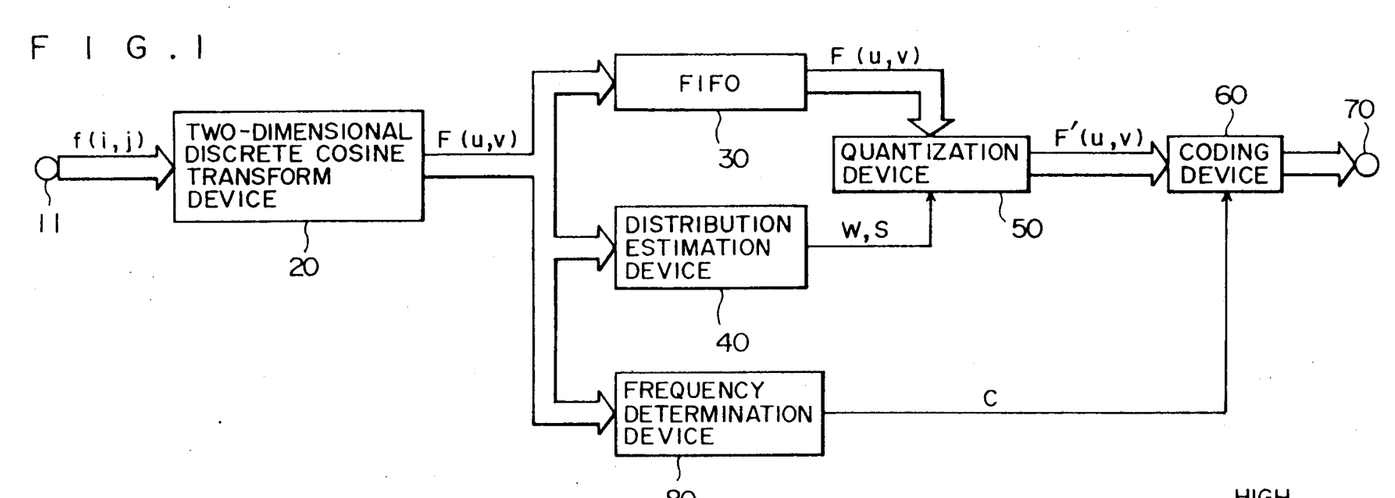
FIG. 1 is a block diagram showing an essential portion of one embodiment of an image data compression apparatus according to the present invention.

In FIG. 1, a terminal 11 is fed with image data which are read out from a frame memory 2 in units of blocks. These image data are fed to a two-dimensional cosine transform device 20 so that they are subjected to the cosine transforms.

Specifically, density information or digitized input image data f(i, j) (i and j=0, 1, 2, 3, - - -, and N-1; N: e.g., 16) are transformed into transform coefficients F(u, v) (u and v=0, 1, 2, 3 . . . , and N-1; N: e.g., 16), which are a function of spatial frequencies u and v.

Figure 2:
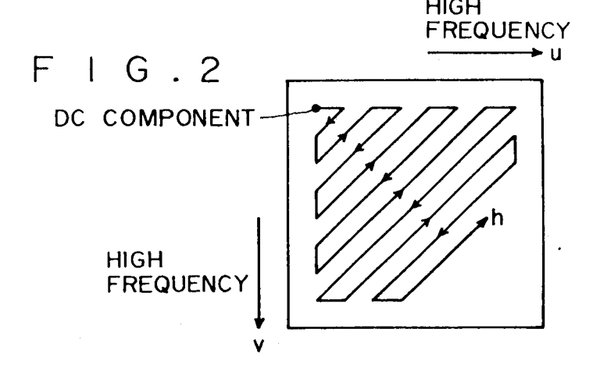
FIG. 2 is a chart showing one example of the scanning sequence of the transform coefficients.

One example of the scanning sequence for the transform coefficients after cosine transform is shown in FIG. 2. In this embodiment, the two-dimensional transform coefficients F(u, v) are reordered into a one-dimensional form by zig zag scanning from a DC component to a higher-frequency range. As a result, the scanning position h can be expressed as the one-dimensional spatial frequency of the transform coefficients.

The transform coefficients F(u, v) are stored sequentially from the DC components in a buffer memory 30 (e.g., FIFO), which can store an N×N number of coefficient values, and are fed to a distribution estimation device 40 and a frequency determination device 80.

The distribution estimation device 40 determines a quantization width W and a cutback threshold value S by using AC components of the transform coefficients F(u, v) inputted and a predetermined threshold value K. How these quantization width W and cutback threshold value S are determined will be described hereinafter.

The quantization width W and the cutback threshold value S are fed to a quantization device 50, which is additionally fed with the transform coefficients F(u, v) read out from the buffer memory 30, so that the quantizations are carried out with reference to the quantization width W and the cutback threshold value S.

The transform coefficients F'(u,v) thus quantized are coded in a coding device 60 until their coded data are outputted from a terminal 70.

To which AC component the coding occurs on, is determined on the basis of a cutoff frequency C which is outputted from the frequency determination device 80. How the cutoff frequency C of the block is to be calculated will be described hereinafter.

Figure 3:
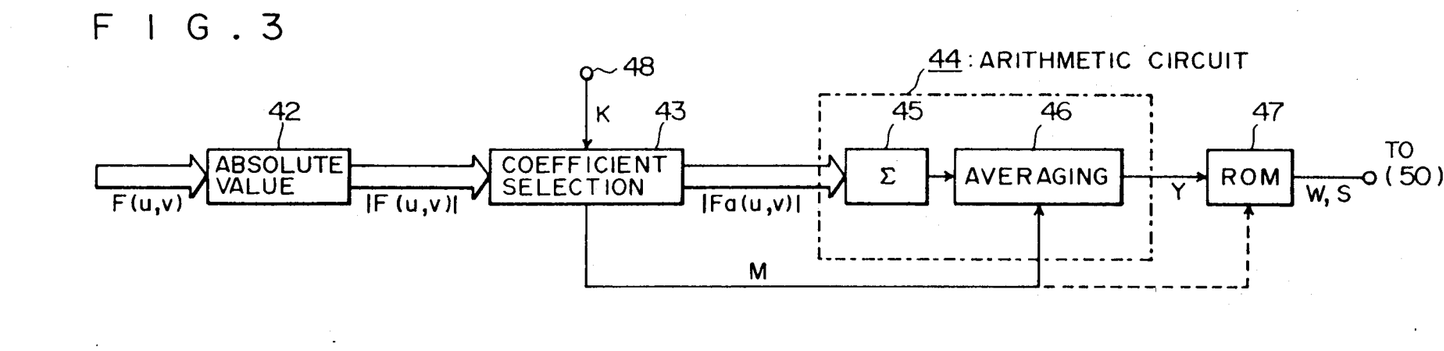
FIG. 3 is a block diagram showing a specific embodiment of a distribution estimation device.

FIG. 3 is a block diagram showing one embodiment of the distribution estimation device 40, which is constructed of an absolute value circuit 42, a coefficient selection circuit 43, an arithmetic circuit 44 and a ROM 47.

Figure 4A:
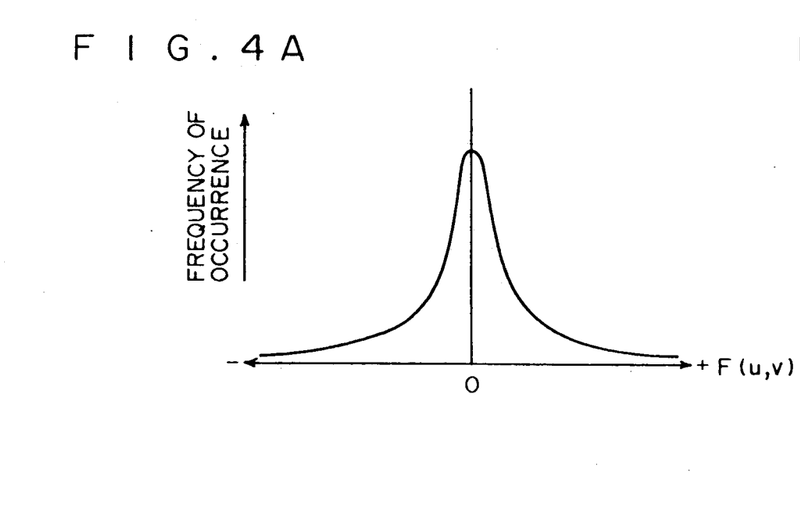
FIGS. 4A and 4B are charts showing coefficient distributions.
Figure 4B:
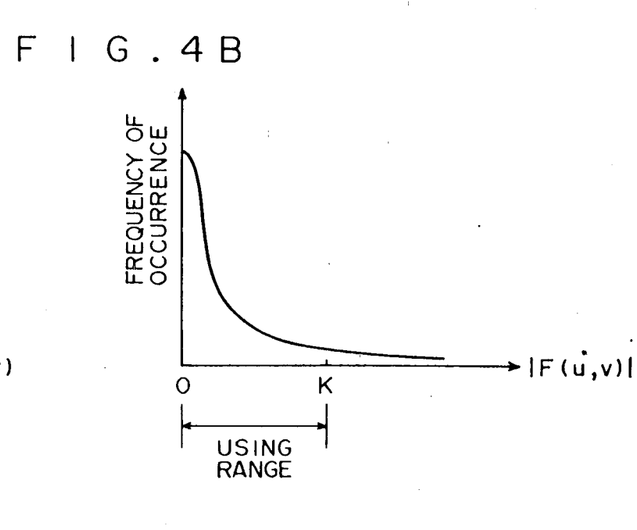

The transform coefficients F(u, v), which are outputted from the two-dimensional discrete cosine transform device 20, are transmitted to the absolute value circuit 42, and then absolute values |F(u, v)| are calculated (as shown in FIGS. 4A and 4B). The output absolute values are inputted to the coefficient selection circuit 43.

This coefficient selection circuit 43 is provided for restricting the coefficients, which are to be used when the quantization width W is determined, and is fed with the coefficient selection threshold value K (as shown in FIG. 4B) through a terminal 48.

The coefficient selection threshold value K to be used may be a predetermined one or may be calculated for each block by a predetermined operation. In the present embodiment, a predetermined threshold value K is used, as determined in the following manner.

Now, if a dynamic range Dn of the AC component of the transform coefficients is defined by the following equation:

$$Dn = 2/N \left( \sum_{i=1}^{N^2} 2^n \right), \tag{1}$$

where n is the number of bits per pixel, and N is block size, then the coefficient selection threshold value K is preferred to be set at the following value of the dynamic range Dn:

$$0.50/2048 \text{ to } 10.0/2048 \tag{2}$$

as will be reasoned hereinafter.

The absolute values |F(u, v)| are compared with the coefficient selection threshold value K thus set so that they are classified in this embodiment into absolute values |Fa(u, v)| equal to or smaller than the coefficient selection threshold value K and absolute values |Fb(u, v)| larger than the coefficient selection threshold value K. Moreover, only the absolute values |Fa(u, v)| (as should referred to FIGS. 8 and 9) thus classified and selected are sent to the downstream arithmetic circuit 44.

In the coefficient selection circuit 43, moreover, the number M of the outputted coefficients Fa(u, v) is counted.

In the arithmetic circuit 44, the absolute values |Fa(u, v)| are subjected to a predetermined arithmetic operation.

This predetermined arithmetic operation is one for calculating the statistical value to determine the quantization width W and the cutback threshold value S. The statistical value to be used may be the dispersion, the standard deviation or the average value of the amplitudes of the AC components selected.

In the present embodiment, an average amplitude value SAM is used with a view to simplifying the circuit structure. Therefore, the arithmetic circuit 44 is composed of an adder 45 and an averaging circuit 46 which uses the aforementioned number M for the averaging operation.

Figure 7A:
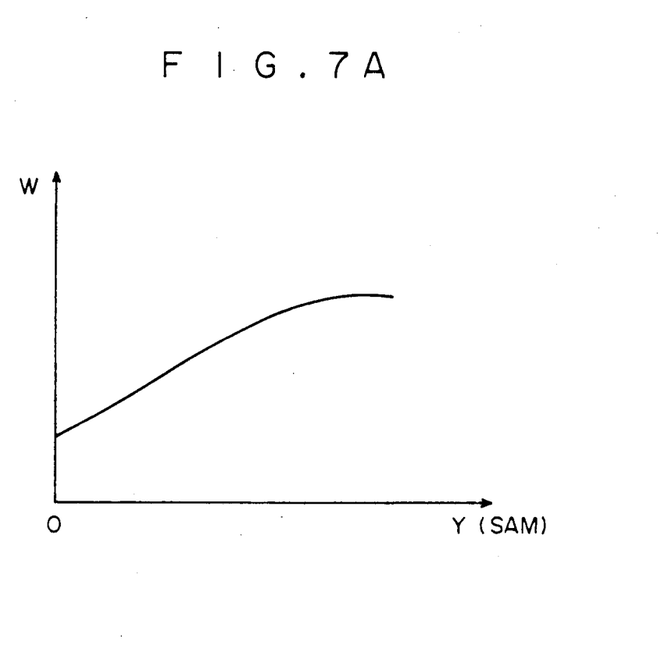
FIGS. 7A and 7B are graphs showing the relations between the distribution estimation result and the quantization width and cutback threshold value.
Figure 7B:
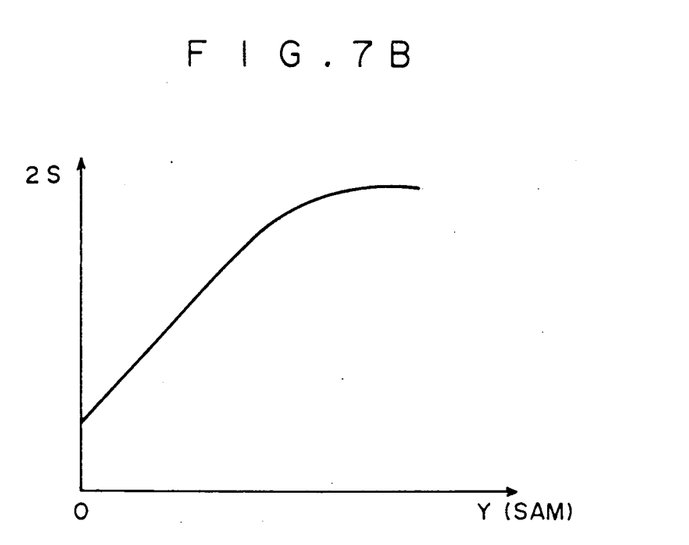

An arithmetic result Y (i.e., the average value SAM in the present embodiment) thus calculated is fed as an address signal to the ROM 47. Then, both a quantization width W and a cutback threshold value S are outputted from ROM 47 (as shown in FIG. 7).

Figure 5:
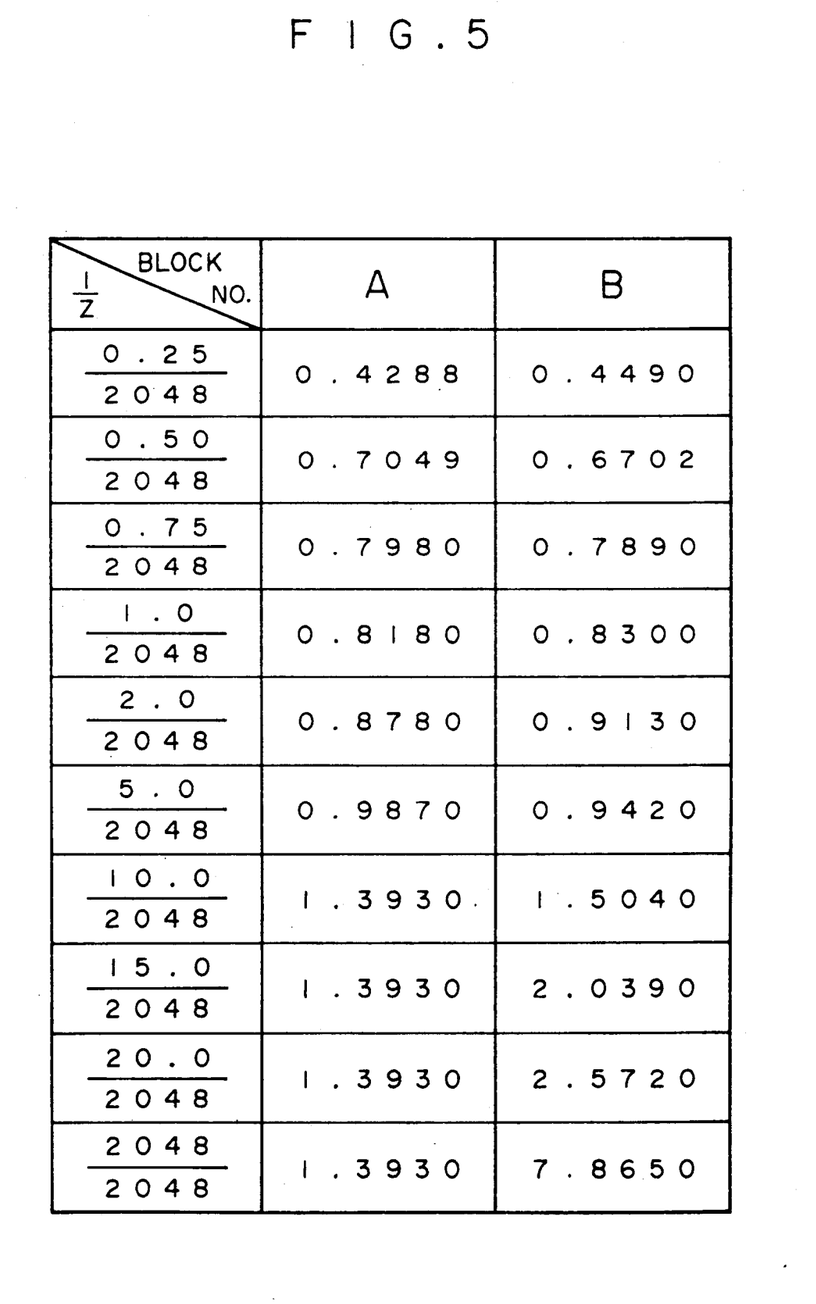
FIG. 5 is a table enumerating the relations between coefficient selection threshold values and average amplitudes of transform coefficients.

Now, FIG. 5 tabulates the relations between the coefficient selection threshold value K and the amplitude average value SAM. The coefficient distributions are exemplified in FIGS. 8 and 9. The range of the histogram shown is from $-3/2048$ to $3/2048$ of dynamic range. The other range is not shown because of the space. FIG. 5 enumerates the average value SAM when the coefficient selection threshold value K is at $1/Z$ of the dynamic range Dn. The average amplitude value without the use of the coefficient selection threshold value K is indicated by $Z=1$.

Figure 8:
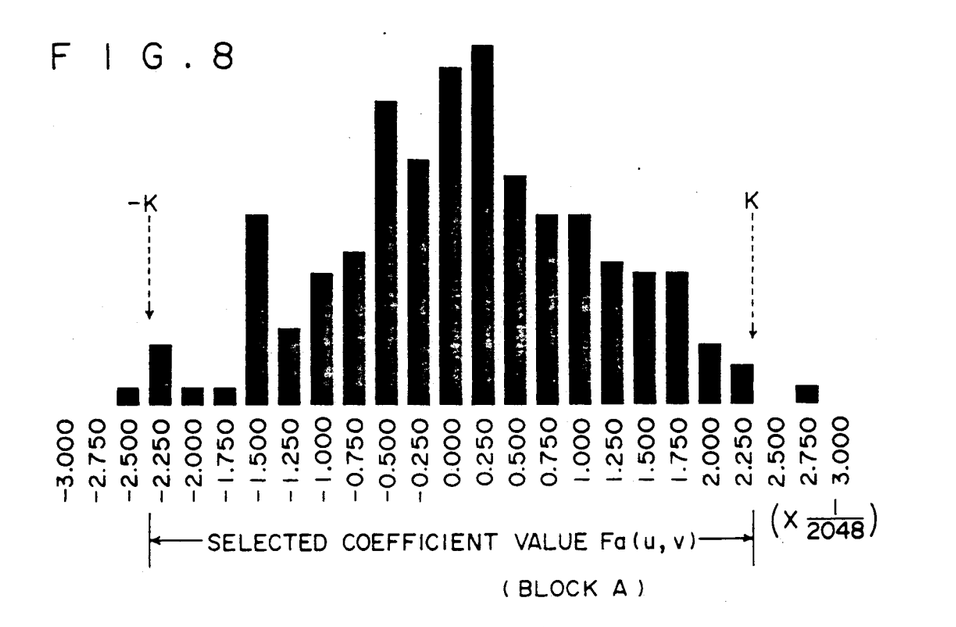
FIGS. 8 and 9 are histograms showing the coefficient distributions of two different blocks.
Figure 9:
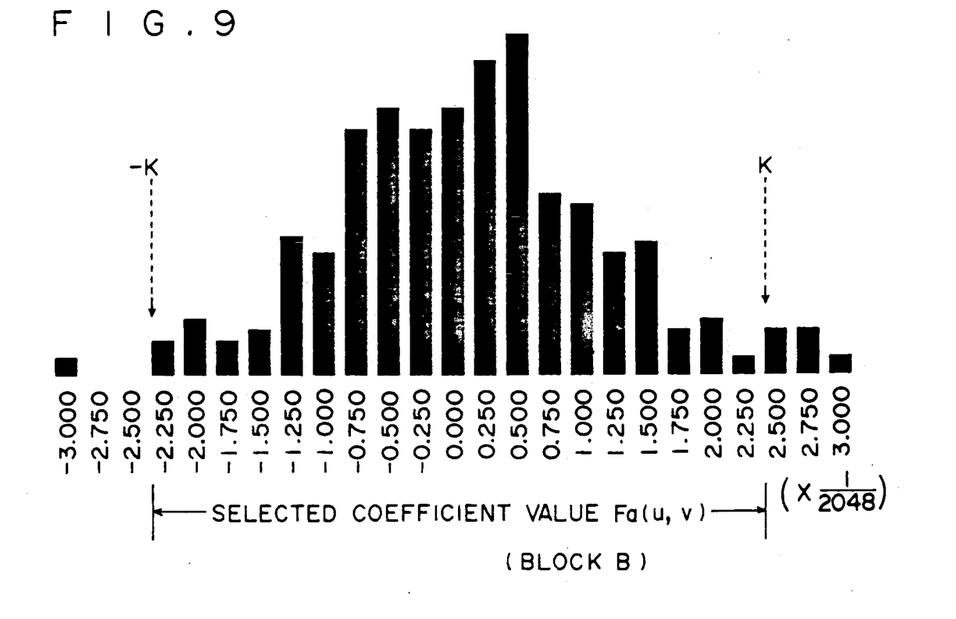

The block A in FIG. 8 and block B in FIG. 9 have very similar shape in the interval $(-K, K)$. However, both are remarkably different at average amplitude value of all AC components ($Z=1$), that is, about 1.39 in block A whereas about 7.87 in block B. The histograms A and B are very large in unevenness, so that they can not approximate the Gaussian distribution exactly.

As is apparent from FIG. 5, if the coefficient selection threshold value K is set to satisfy the equation (2) thereby selecting the upper limit of the transform coefficients to be used, the individual average amplitude values SAM take a substantially equal value even if the coefficient distributions are unlike the Gaussian distribution but are similar in distribution shape in the interval $(-K, K)$ to each other, as shown in FIGS. 8 and 9.

If the average amplitude values SAM are equal, the quantization width W and the cutback threshold value S to be referred to take an equal value. In other words, the coefficient distributions in the interval $(-K, K)$ can be accurately grasped if the aforementioned coefficient distribution estimations are accomplished.

If the average values SAM are different, the corresponding quantization width W and cutback threshold value S are outputted from the ROM 47. In case, however, the number M is below a predetermined value, constant values are outputted for the quantization width W and the cutback threshold value S.

Since it is indicated by a very small value M that the AC component of the transform coefficients has an accordingly wide distribution, the quantization width W and the cutback threshold value S are then advisably limited to the constant values.

Incidentally, in the case of the coefficient distribution shown in FIGS. 8 and 9, the difference between the blocks A and B is very small even if K is 0.25/2048 of Dn. Since, in this case, the number M of the transform coefficients to be used is too small, a larger number is selected for the recommended range of K in this embodiment.

The aforementioned arithmetic circuit 44 can be omitted in order to address the ROM 47 by the use of the data of the number M only (as shown by a broken line in FIG. 3).

The transform coefficients are quantized by the quantization width W and the cutback threshold value S. As shown in FIG. 6, more specifically, all amplitudes of the transform coefficients smaller than the cutback threshold value S are quantized to zero ($a_0$), and the transform coefficients F(u, v) in each quantization width W are quantized to the corresponding values $+a_i$ and $-a_i$ ($i=1, 2, 3, ---$).

The frequency determination device 80 adaptively calculates the maximum frequency (or the cutoff frequency) C to be handled at its block, as will be exemplified in the following.

In this example, the block characteristic value X expressing the characteristics of the block is calculated for each block to deduce the upper limit number Ma of the transform coefficients to be cut, i.e., the lower limit cutoff frequency F. This lower limit cutoff frequency F indicates the lower limit of the finally determined cutoff frequency C.

Figure 10:
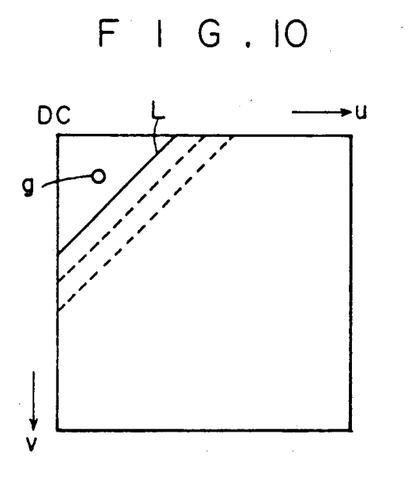
FIGS. 10 to 13 are charts to be used for explaining the cutoff frequency.

In FIG. 10, a boundary value L (as indicated by a straight line) designates the upper limit number Ma of the transform coefficients to be cut or the lower limit cutoff frequency F.

Meanwhile, when the component characteristic values r of the AC components of the block are calculated, they are compared with a predetermined threshold value R. If some component characteristic values r exceeding this threshold value R are present, there is outputted the highest frequency AC component (i.e., the maximum frequency Fmax) having a characteristic value r exceeding the threshold value R.

Moreover, this maximum frequency Fmax and the lower limit cutoff frequency F are compared. If the maximum frequency Fmax is higher than the lower limit cutoff frequency, the higher frequency is always used as the cutoff frequency C of the block (as indicated by broken lines in FIG. 10).

As a result, the cutoff frequency of the block is adaptively controlled. The AC components of amplitude which are higher than a predetermined threshold value R are not cut but quantized and coded.

The absolute values of the AC components, sums or square sums of the absolute values of the neighboring AC components can be used as the component characteristic value r of the AC component of the individual blocks. In the embodiment to be described hereinafter, the absolute values of the AC components are used.

If, on the contrary, the maximum frequency Fmax is lower than the cutoff frequency, as indicated at point g in FIG. 10, not the maximum frequency Fmax but the lower limit cutoff frequency F is set as the cutoff frequency C at its block.

As a result, the lower limit of the frequency to be cut is restricted so that the quality of each block is sufficiently warranted.

Thus, the cutoff frequency C of the block is adaptively controlled in accordance with the characteristics of the same block. On the other hand, the AC components of which amplitude are higher than a predetermined level are not cut but quantized and coded.

Figure 11:
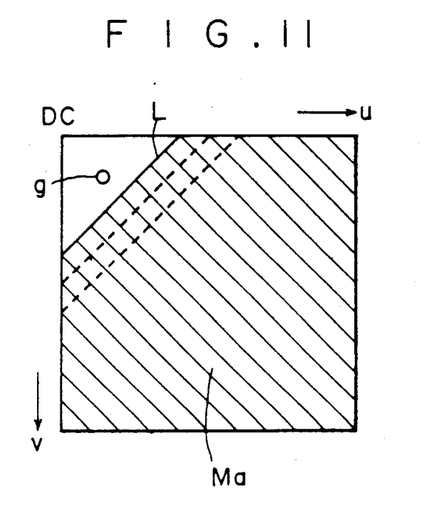

FIG. 11 shows the number of cutoff frequencies C to be adaptively changed, with reference to the number of the transform coefficients to be cut.

The upper limit number of the transform coefficients to be cut, which is determined by the aforementioned block characteristic value X, is designated as the boundary of MA. This upper limit cutting number Ma is designated by the hatched region (or area).

When the cutting numbers m determined from the component characteristic value r of the individual AC components of that block and the predetermined threshold value R are smaller than the aforementioned upper limit cutting number Ma, the smallest number m is used as the actual one. Then, the boundary for determining the cutting number is shifted to a higher-frequency range, as indicated by the broken lines in FIG. 11.

If the number m is larger than the upper limit cutting number Ma, as indicated at point g in FIG. 11, the number Ma for determining the boundary value L is set to the actual upper limit cutting number. As a result, the upper limit (which corresponds to the lower limit of the cutoff frequency, if expressed in terms of the frequency) of the number to be cut off is restricted.

The aforementioned boundary value L, that is, the boundary value determined by the upper limit cutting number Ma or the lower limit cutoff frequency F may be changed in accordance with the compression ratio designated from the outside.

Figure 12:
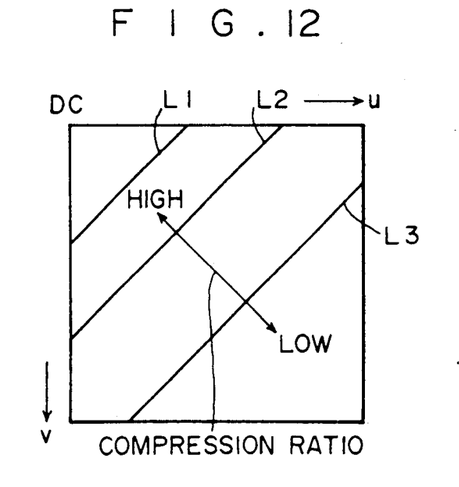

FIG. 12 shows one example, in which the upper limit number of the transform coefficients to be cut is increased for the higher compression ratio. This means that the lower limit cutoff frequency comes closer to the lower-frequency range. As a result, the boundary values are changed in the direction of L3, L2 and L1 as the compression ratio grows higher.

Moreover, these boundary values determined in dependence upon the compression ratio are adaptively varied in accordance with the contents of the blocks.

When the lower limit of the cutoff frequency is thus set, its upper limit may be set. This setting of the upper limit cutoff frequency is accomplished to keep the compression ratio from reaching an excessively low level.

Figure 13:
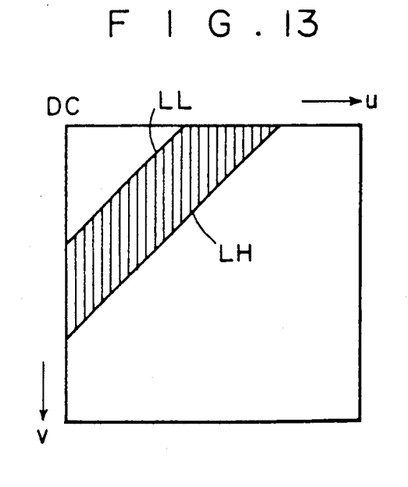

FIG. 13 shows this case, in which examples of the lower limit boundary LL and upper limit boundary LH of the cutoff frequency are given when a certain compression ratio is set.

When the upper limit cutoff frequency LH is thus set, it exerts a restriction upon the upper limit of the applicable range of the cutoff frequency C.

Figure 14A:
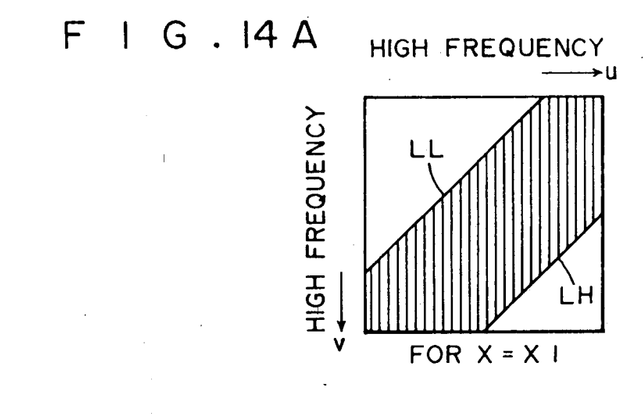
FIGS. 14A to 14C, FIGS. 15A to 15C, FIG. 16 and FIG. 17 are charts and graphs showing examples of proper ranges of cutoff frequency positions.
Figure 14B:
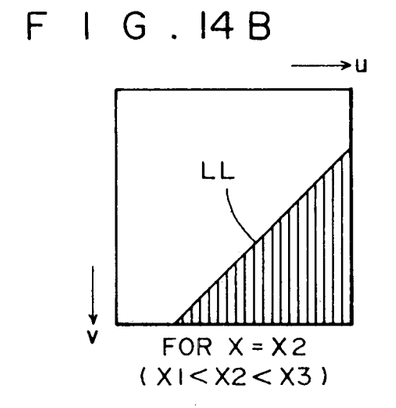
Figure 14C:
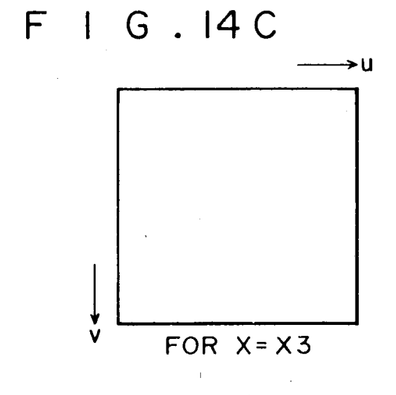
Figure 15A:
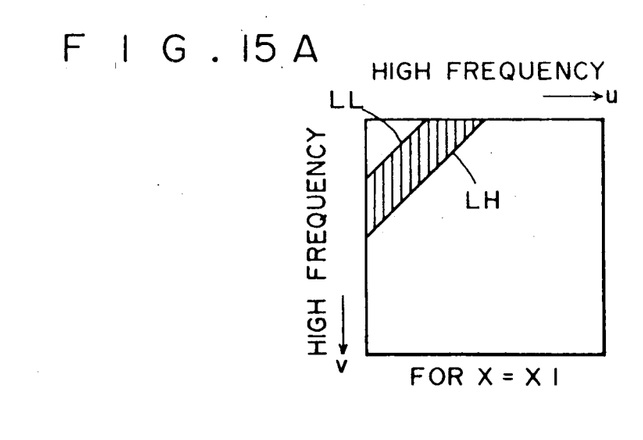
Figure 15B:
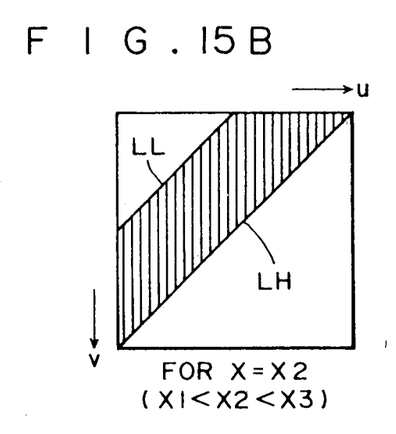
Figure 15C:
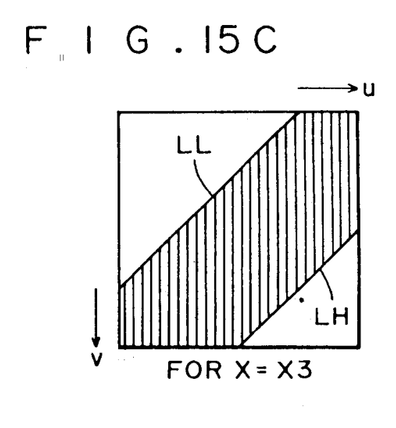
Figure 16:
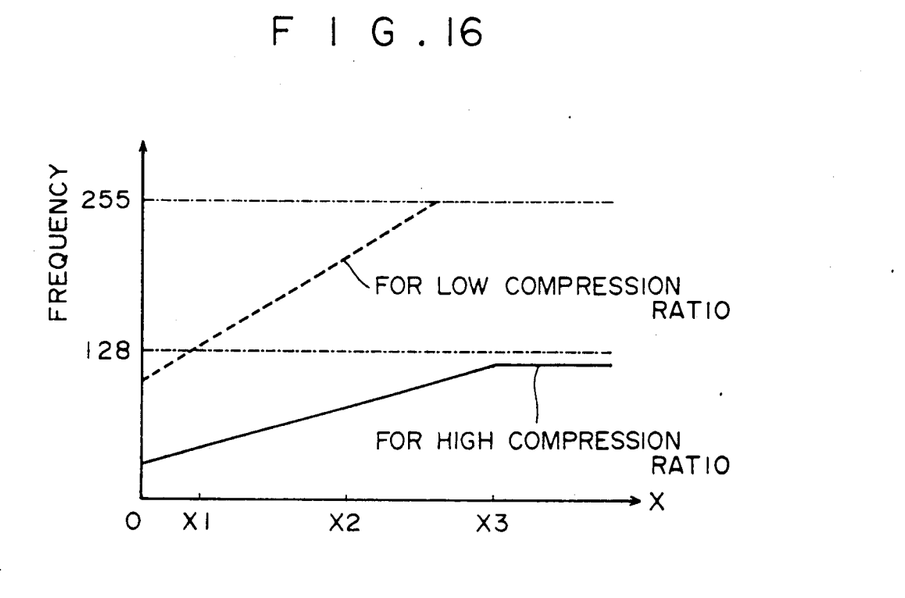
Figure 17:
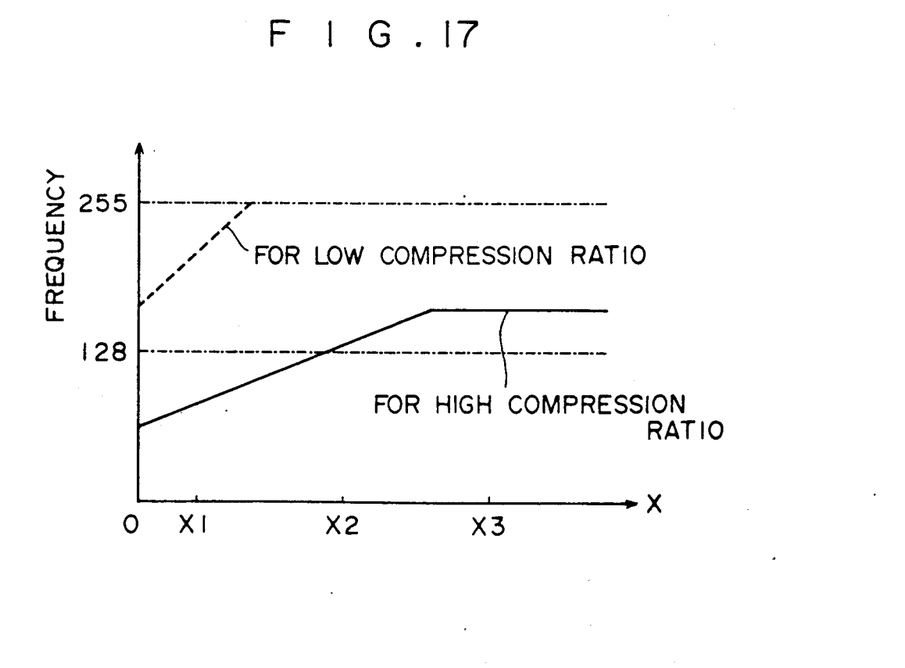

FIGS. 14A to 14C and FIGS. 15A to 15C are charts showing the relations between the compression ratios to be set from the outside and the block characteristic value X. In FIGS. 14A to 14C, a low compression ratio is given, whereas in FIGS. 15A to 15C, a high compression ratio is given. FIGS. 16 and 17 are characteristic graphs when those relations are expressed in terms of the frequency. FIG. 16 shows a lower limit boundary LL, whereas FIG. 17 shows an upper limit boundary LH.

The lower limit boundary LL and the upper limit boundary LH are spontaneously different, as shown in FIGS. 14A to 14C, FIGS. 15A to 15C, FIGS. 16 and 17, between the case of the smaller block characteristic value X when few images contain the density changes such as edges and the case of the larger statistical characteristic value X when some images contain the density changes.

When the block characteristic value X is medium (X2) and for the lower compression ratio, as shown in FIG. 14B, the lower limit cutoff frequency LL becomes relatively high so that the upper limit cutoff frequency is unlimited. In case the block characteristic value X is so extremely large as X3 (as shown in FIG. 14C), the upper limit and the lower limit of the cutoff frequency coincide with each other, and all AC components become objects to be coded.

Figure 18:
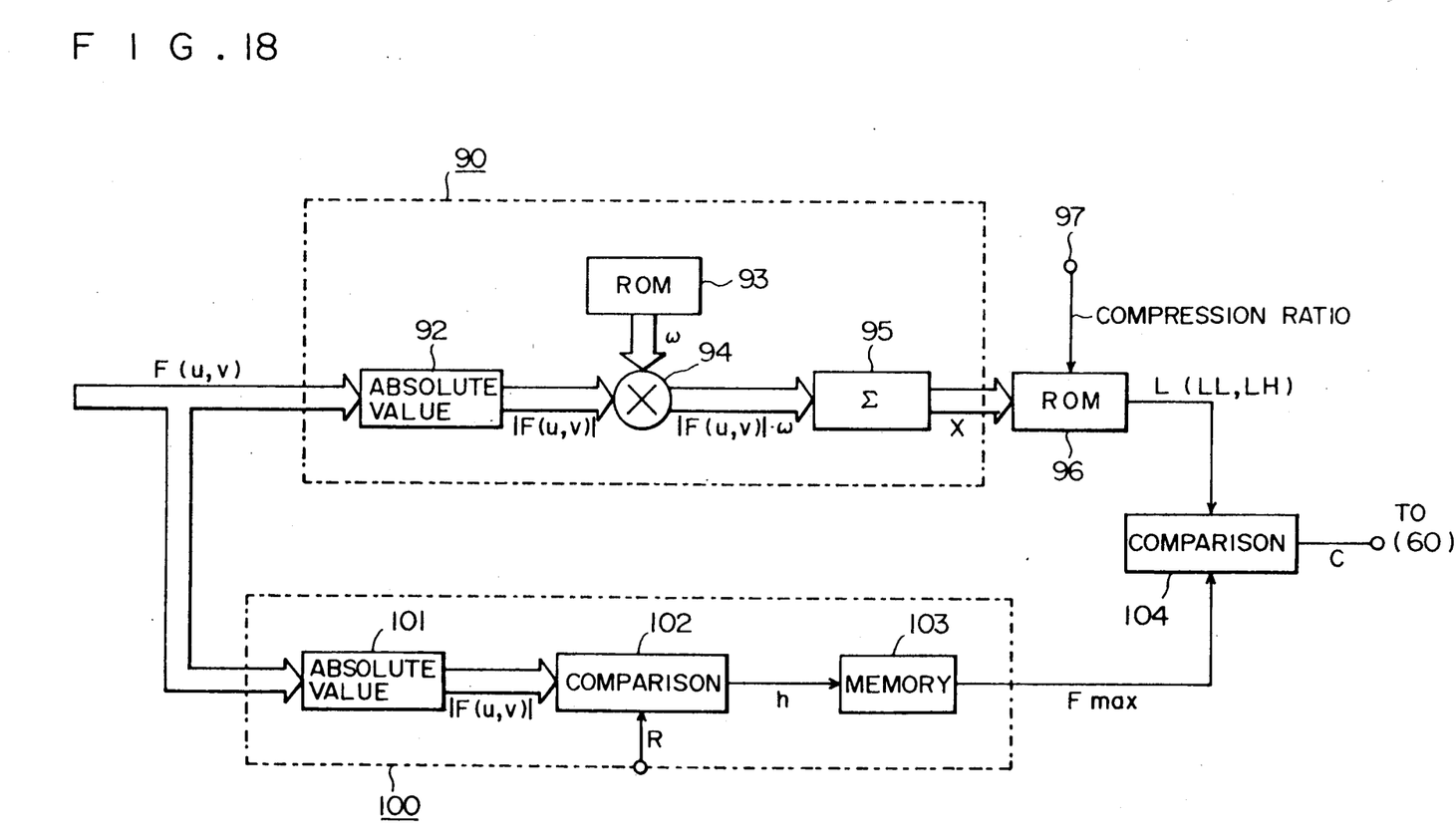
FIG. 18 is a block diagram showing one embodiment of a frequency determination device forming an essential portion of the present invention.

Now, FIG. 18 shows a specific embodiment of the frequency determination device 80 when not only the lower limit but also the upper limit are set for the cutoff frequency C.

The frequency determination device 80 is equipped with an arithmetic circuit 90 and a frequency determination circuit 100.

The transform coefficients F(u, v) are fed to the arithmetic circuit 90 so that the block characteristic amounts X in their blocks are calculated. This block characteristic value X is not only the AC power but also the sum of the absolute values of the AC components and the magnitude of the quantization width W or may use other statistical characteristic amounts of the individual blocks.

In the present case, the sum of the absolute values is used.

Therefore, the arithmetic circuit 90 is equipped with an absolute value circuit 92, which is fed with the transform coefficients F(u, v) sequentially in accordance with the scanning order h to get their absolute values $|F(u, v)|$. These absolute values $|F(u, v)|$ are then multiplied by a weighing coefficient $\omega(u, v)$ corresponding to the transform coefficients (as $|F(u, v)| \cdot \omega(u,v)$ by a multiplier 94.

The weighting coefficient $\omega(u,v)$ relating to the transform coefficients is stored in a ROM 93 and read out for the multiplication synchronously to the scanning order h.

The weighed absolute value outputs of all the transform coefficients are accumulated in an adder 95. The resultant accumulatively added output is used as the block characteristic value X of the block.

Here, sum of the normal absolute values is calculated as the block characteristic value X, if the weighting coefficient $\omega(u,v)$ is not depended on the frequency and is a fixed value. On the other hand, if the weighing coefficient $\omega(u,v)$ is selected so as to have a larger value for the higher frequency component, a block characteristic value X, wherein the high frequency component is thought as important, can be obtained.

Further, if the weighting coefficient $\omega(u,v)$ is selected so as to have a larger value for the lower frequency, a block characteristic value X, wherein the low frequency component is thought as important, can be obtained.

This block characteristic value X of the block is fed as address data of a ROM 96 so that the corresponding upper and lower limit boundary values L (i.e., LL and LH) are outputted and are fed to a comparator 104.

The boundary values L are different in dependence upon the designated compression ratio, as has been described hereinbefore. As a result, the ROM 96 is fed with a selection signal relating to the compression ratio designated though a terminal 97, and different tables are referred to in accordance with the designations of the compression ratios.

On the other hand, the frequency determination circuit 100 is constructed in the present embodiment, as will be described in the following.

Figure 19:
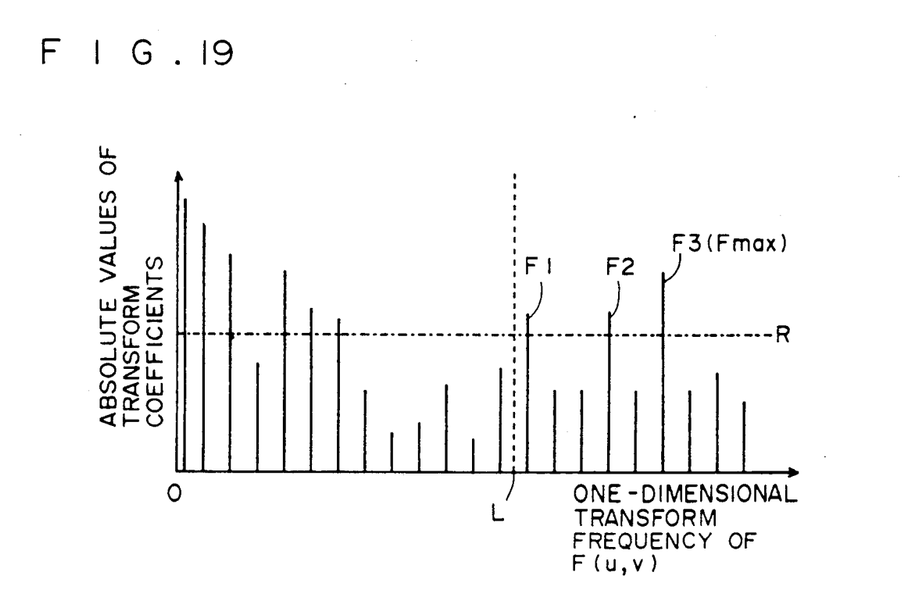
FIGS. 19 and 20 are charts to be used for explaining the frequency determination device.

In the present embodiment, the absolute values of the individual AC components of the block are used as the component characteristic values r of the individual AC components of the block. As a result, the transform coefficients F(u, v) are transformed by an absolute value circuit 101 into their absolute values, which are compared with the predetermined threshold value R in comparator 102 (as shown in FIG. 19).

From this comparator 102, there are outputted only the scanning orders h of the transform coefficients of which amplitudes (absolute values) exceed the threshold value R. These transform coefficients are temporarily stored in a memory 103, the value of which is updated each time the comparison output is obtained from the comparator 102.

In the embodiment shown in FIG. 19, a first value to be stored, which is positioned on the high frequency side over the boundary value L, is F1, and the component having the higher frequency is stored later. When all the components of one block are calculated by the frequency determination circuit 100, memory 103 stores the highest frequency Fmax, i.e., the frequency value of the AC component having the highest frequency in the AC components having amplitudes exceeding the threshold value R. In the embodiment shown in FIG. 19, the value F3 is stored as the highest frequency Fmax.

This highest frequency Fmax and the aforementioned boundary value L are fed together to the comparator 104 and are compared, as follows, so that the compared results are outputted.

1. Since the boundary value L indicates the frequencies of the transform coefficients, the highest frequency Fmax is selected as the cutoff frequency C of the block, if Fmax is higher than the lower limit LL and lower than the upper limit LH.
2. The lower limit LL is selected as the cutoff frequency C of the block if the maximum frequency Fmax is lower than the lower limit LL.
3. The upper limit LH is selected as the cutoff frequency C of the block if the maximum frequency Fmax is higher than the upper limit LH.

The cutoff frequency C thus determined is fed to the coding device 60, as shown in FIG. 1, so that the coding treatment is limited up to that cutoff frequency C.

As a result, the coding treatment occurs until scanning position h, at which the cutoff frequency C is obtained, so that the higher-frequency coding treatment is stopped.

In case this coding treatment is to be stopped, in order to achieve the data recognition between the blocks, it is advisable either to add the scanning position h at the head of the coding data of each block or to add the ending code at the end of coding data of each block.

The remaining whole AC components after the scanning position h may be coded to zero without stopping the coding treatment. Alternatively, the quantization width at and after the scanning position h may be made larger than that before the scanning position h so that it may be coded.

In the coding device 60, as shown in FIG. 6, the coefficient values quantized to zero (ao) are coded to the Run Length codes whereas the remaining quantized values are coded to the Huffman codes. The B1 codes can be used in the case of the Run Length codes.

The coding may be accomplished with only the Huffman codes.

Figure 20:
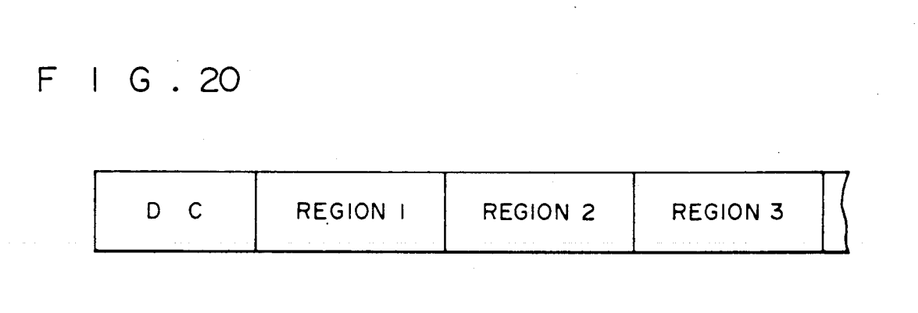

In the description thus far made, the characteristic values of the individual AC components of the block are used to calculate the cutoff frequency C. As shown in FIG. 20, all the AC components in the block may be classified into several groups (or regions) so that the cutout frequency C may be determined on the basis of the characteristic value of the AC components in the group. In the above embodiment, the orthogonal transform is explained by using the cosine transform. However, the other transforms such as slant transform, Hadamard transform or Fourier transform may be used.

In the circuit system in FIG. 18, the absolute value circuits 92 and 101 may be used in common.

According to the present invention, moreover, there is provided the image data compression apparatus, wherein digital tonal image data is divided into a plurality of blocks, an orthogonal transform is performed in units of blocks to obtain transform coefficients, and the transform coefficients are quantized and coded, characterized in that the component characteristic values r of the AC components in the block are compared with a predetermined threshold value R so that a frequency of the AC component at the highest frequency side having said characteristic values r, if any, is determined as a boundary value.

Since the cutoff frequency of the high-frequency component is adaptively determined in view of the characteristic amounts of the block, the edge portions are neither blurred, nor the image qualities or the S/N retios are seriously deteriorated, when the image is restored.

According to the present invention, therefore, the block boundary artifacts which might otherwise occur due to the improper cutoff frequency, can be suppressed to compress the image data while retaining a higher image quality than that of the prior art.

Thus, the image data compression apparatus according to the present invention can be suitably applied to a compression apparatus for the medical images required to have high image qualities, as has been described hereinbefore.

As has been described hereinbefore, according to the present invention, there is provided the image data compression apparatus, wherein digital tonal image data is divided into a plurality of blocks, an orthogonal transform is performed in units of blocks to obtain transform coefficients, and the transform coefficients are quantized and coded, characterized in that when the transform coefficients in the high-frequency side in the block are cut off according to the image content of the block, the lower limit of the cutoff frequency to be cut is determined, so that frequency lower than the lower limit may not be cut.

Thus, even if the maximum frequency relating the block and calculated on the basis of the characteristic amounts of the AC components in the block is below the lower limit, the cutoff frequency to be selected in this instance is the frequency which is determined by the lower limit.

As a result, the high-frequency components in the block are not carelessly cut, thus providing a feature that the defects of the adaptive high-frequency cutoff can be cleared off.

As a result, the image qualities of the individual blocks can be warranted to provide an effect that the image quality of a reconstructed image can be improved.

Thus, the image data compression apparatus according to the present invention can be remarkably suitably applied to a compression apparatus for the medical images required to have high image qualities, as has been described hereinbefore.

What is claimed is:

1. An apparatus for compressing image data, comprising:
   (i) means for generating a first transform coefficient corresponding to said image data using an orthogonal transform;
   (ii) estimating means for generating estimation signals in accordance with said first transform coefficient to include a quantization width and a first threshold value;
   (iii) means for generating a quantized second transform coefficient in accordance with said quantization width and said first threshold value to have a plurality of first transforming value signals corresponding to transform frequencies;
   (iv) means for generating an original cutoff frequency in accordance with said first transform coefficient; and
   (v) means for generating coded data based on said second transform coefficient and said cutoff frequency wherein said coding means cuts off from said second transform coefficient portions of said first transforming value signals of frequency having a lower limit that can be higher than said original cutoff frequency, said lower limit becoming a new cutoff frequency.

2. The image data compression apparatus of claim 1, wherein said cutoff frequency generating means comprises:
   (i) an arithmetic circuit which generates a block characteristic value in accordance with a first transform coefficient;
   (ii) means for generating a lower limit boundary value in accordance with said block characteristic value and a predetermined compression ratio corresponding to a desired compression ratio;
   (iii) means for generating component characteristic values in accordance with said first transform coefficient;
   (iv) comparison means for comparing said component characteristic values to a second threshold value to output scanning order signals for which said characteristic values are larger than said second threshold value;
   (v) memory means for storing absolute value signals of higher frequency than that of absolute value signals previously stored therein; and
   (vi) second comparison means for generating said cutoff frequency by a comparison of said boundary value with a highest frequency of said absolute value signals stored in said memory means.

* * * * *